March 24, 1964  C. H. SAUER  3,126,073
BRAKE SYSTEM FOR WHEEL SUPPORTED VEHICLES
Filed Nov. 19, 1962
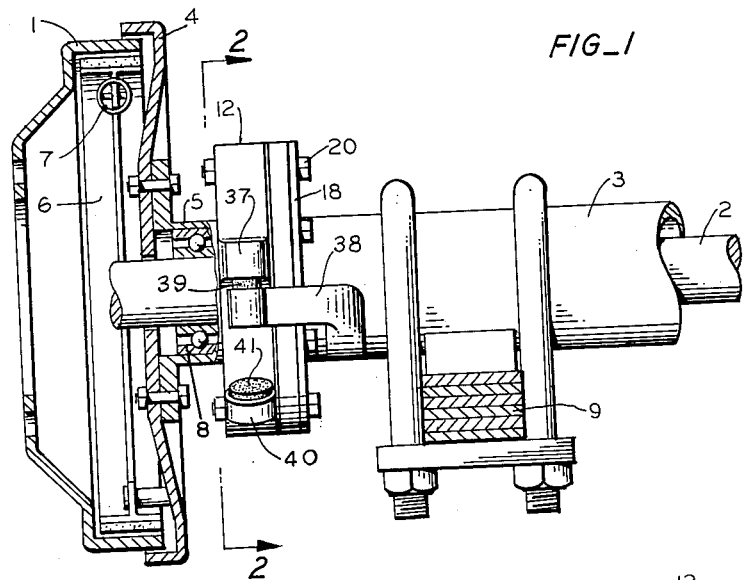
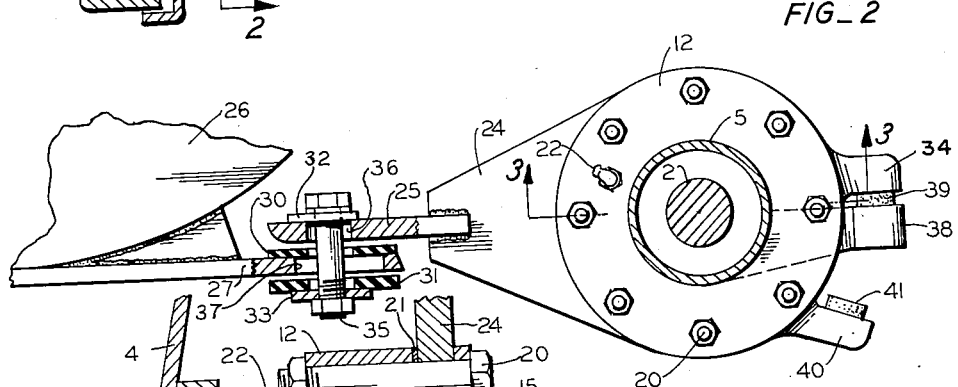
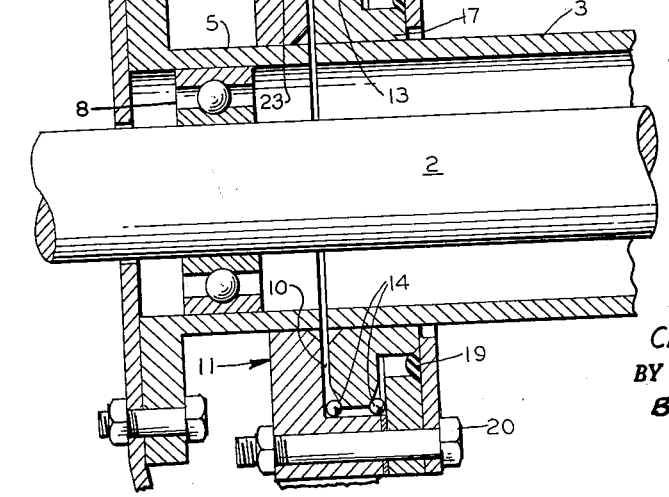
INVENTOR.
CHRISTIAN H. SAUER
BY
Boyken, Mohler + Foster
ATTORNEYS

United States Patent Office 3,126,073
Patented Mar. 24, 1964

3,126,073
BRAKE SYSTEM FOR WHEEL SUPPORTED
VEHICLES
Christian H. Sauer, 828 Wall St., Chico, Calif., assignor
of one-half to G. W. Stiefvater, Chico, Calif.
Filed Nov. 19, 1962, Ser. No. 238,633
6 Claims. (Cl. 188—2)

This invention relates to a brake system for wheel supported vehicles, and has for one of its objects the provision of an improved brake system for transmitting the torque of the rear wheels of a vehicle to the body of the vehicle through the brake shoes, backing plate and springs of a vehicle to the body in a downward direction upon application of the brakes.

In my United States Letters Patents No. 2,434,055 of January 6, 1948, and No. 2,608,262 of August 26, 1952, are shown and described means for accomplishing similar results. The desirability of the results of a system adapted to transmit the torque that is applied to the backing plate in a braking operation is fully disclosed in said patents. However, the present invention is an improvement thereover from a structural standpoint in that it is more efficient, more economical to make and to install, and more economical to maintain.

In the earliest of the two patents above mentioned, a rigid arm was directly connected with the backing plate of each rear wheel. Each arm extended forwardly and was connected at its forward end to the frame of the vehicle. The brake shoes were carried on the backing plates in the usual manner, but the backing plates were free to revolve with the brake drums on the rear wheels when the brake shoes engaged the drums upon application of the brakes, except for the arms that connected the backing plates with the frame. These arms were positioned so their forward ends moved downwardly, and thus the torque from the rear wheels would be transmitted through the backing plates to the frame or body to pull the frame downwardly and to thereby tend to collapse or flatten the springs. The degree of downward force so transmitted would, of course, be directly proportional to the pressure applied to the brakes and to the speed of the vehicle when the brakes were applied, and this force would be transmitted to the tires and from thence to the highway, thereby increasing the frictional resistance between the tires and the surface of the highway. The result was that the likelihood of skidding upon sudden application of the brakes to a rapidly moving vehicle was substantially eliminated. Also, the vehicle would be stabilized under conditions that otherwise would in many instances result in loss of control of the vehicle.

The system of transmitting the torque directly from the backing plate to the frame naturally necessitated making changes in the conventional brakes so that the backing plate would be free to rotate independently of the axle housing. In conventional brakes the backing plate is rigid with the rear axle housing. In the first of the above mentioned patents the backing plates were modified for supporting them on bearings. This was a relatively expensive procedure, and also resulted in the displacement of the backing plate as the bearings would wear under the severe strains applied thereto. Thus the braking efficiency would ultimately be impaired.

In the second of the above mentioned patents this difficulty was overcome by mounting the body supporting springs on bearings so the rear axle housing was free to rotate. The backing plates were left rigid with the rear axle housing. One or more arms rigid with the rear axle housing were projected forwardly and their forward ends were connected with the body or frame of the vehicle.

The above structure satisfactorily accomplished the result of transmitting the braking torque to the body, but at a severe strain on the universal joint or coupling between the drive shaft and the gears of the differential assembly. Also, the bearings for the springs added expense and problems not present when the springs were connected with the axle housing in the usual manner.

The present invention satisfactorily overcomes objections to both of the systems mentioned in that the backing plates remain the same, and the spring mountings remain rigidly secured to the portion of the rear axle housing that carries the differential housing, and no braking torque is transmitted to said differential portion of the housing. The braking torque from the backing plates is transmitted to the frame or body in a manner that avoids any twisting strain on bearings or any objectionable wear on any of the parts of the torque transmitting assembly. This is accomplished by connecting the opposite end portions of the axle housing with the intermediate portion by bearings at points disposed between the spring mountings and the backing plates, and by connecting said end portions with the frame or body at points ahead of the rear axle housing. The backing plates remain rigidly secured to the end portions of the rear axle housing exactly as they do in conventional structure, and the springs remain connected with the intermediate portion of the rear axle housing in exactly the same manner as in conventional structure.

Other objects and advantages will appear in the description and in the drawings.

In the drawings, FIG. 1 is a side elevational view of one end of the rear axle housing of an automobile, with a conventional brake drum and backing plate indicated in cross section and of simplified form to merely show the essential parts, the wheel to which the brake drum is rigidly bolted being omitted.

FIG. 2 is a cross sectional view taken along line 2—2 of FIG. 1 with part of the bearing broken away to show inside structure.

FIG. 3 is a cross sectional view taken along line 3—3 of FIG. 2.

In detail, referring to FIG. 1, the numeral 1 represents the conventional brake drum in a wheel. A drum 1 is rigid with each rear wheel, the wheel axle being indicated at 2, the latter being rotatable within the axle housing 3. In an automobile, the differential housing is intermediate the ends of the axle housing and is rigid with the latter. Both ends of the axle housing are the same, hence the description of the end shown in FIG. 1 will apply to both ends.

Adjacent to each brake drum 1, and coaxial therewith, is a backing plate 4. This backing plate 4 is rigidly connected with the terminating end portion 5 of housing 4. Conventional brake shoes 6 are carried by each backing plate, which shoes are connected with conventional hydraulically actuated means 7, for expanding the shoes to contact the drums for applying the brakes, and the usual spring means is connected with the shoes for releasing them. The conventional system is described and shown in the aforesaid patents.

In an automobile the brakes may be applied by the usual pedal actuated hydraulic means of the brake system.

The above braking system is common in all automobiles, and insofar as the present invention is concerned it is immaterial whether the brake shoes are actuated through mechanical, hydraulic, or electric means, although dangerous skidding of a vehicle is more imminent where a sudden and strong braking action may occur, as in the case of hydraulically actuated brakes, due to the ease with which an operator may transmit a powerful braking force to the drums.

At this point it may also be observed that the present invention is equally applicable to braking systems employing disc brakes where one of the discs is substantially stationarily connected with the axle housing, prior to the application of the present invention, insofar as rotation of the discs are concerned.

In the conventional braking system the end portions 5 of the rear axle housing are integrally connected with the latter. In fact they are unitarily formed. Hence, when the brakes are applied, a strong torque force is applied to the rear axle housing. In some instances torque rods are connected with the rear axle housing and with the chassis of the automobile to prevent any rotation of the axle housing under this torque force. In other instances the springs that are connected with the axle housing and on which the chassis is sprung, will absorb the torque, although slight rotation of the axle housing may occur. In either instance, springs, such as semielliptical springs 9 are rigidly secured to the axle housing adjacent to but spaced from each backing plate.

In the present instance, assuming the outer end portion 5 at the end of each axle housing 3 were rigid with the housing 3, the structure already described would be conventional.

The present invention separates the end portions 5 from the intermediate or main portion 3 of the axle housing, and provides a bearing connection between each portion 5 and said intermediate portion so the end portions 5 will be substantially free from resistance to rotation as a unit with the backing plates on bearings 8, that also support axle 3 for rotation therein, when the rear brakes are applied, except for a torque transmitting structure, as will be described later on.

Referring to FIG. 3, the line of division between each outer end portion 5 and the intermediate portion 3 of the rear axle housing is indicated at 10.

Integrally connected with each end portion 5 of said line of division 10 is a radially outwardly projecting circular member 11, which member has a flange 12 at its outer periphery projecting axially from member 11 over the adjacent end of part 3.

Integrally connected with the housing 3 and within the annular flange 12 is a radially outwardly projecting circular member 13. This member 13 provides the inner race for ball bearings 14, while the member 11 and flange 12 coact to form the outer race.

A circular plate 15 is positioned against the axially facing end surface of the annular flange 13, except for shims, as will later be mentioned.

The member 13 has an axially projecting annular hub 17 thereon that is secured to housing 3 and which hub projects away from the member 11 on the end portion 5, and the axially facing outer end surface of the hub 17 is preferably substantially coplanar with the surface of the plate 15 that faces away from the flange 12.

A circular face plate 18 concentric with hub 17 and flange 12 is secured against the axially facing end of plate 15 and extends radially inwardly to lapping relation to the end surface of hub 17. This plate carries an annular seal 19 on the side thereof that faces the hub 17 for sealing the space between the plate 15 and hub 17 against loss of grease and ingress of water and foreign solids.

The member 13 is beveled at its outer peripheral corners and the ball bearings 14 are held between said beveled surfaces and the juncture between the flange 12 and member 11, and the juncture between the radially inwardly facing surface of flange 12 and the plate 15, whereby the ball bearings will function to take thrust as well as radial forces.

The flange 12, plate 15 and the face plate 18 are formed with equally spaced, registering openings for bolts 20 that function to hold the plates 15 and 18 tightly against the flange 12, although shims 21 may be positioned between plate 15 and the flange 12 to prevent objectionable pressure against the balls, but at the same time to maintain seal 19 sufficiently snug to retain the grease between the races of the bearing assembly. Obviously shims may be removed, as required, to provide a take-up for wear.

A conventional grease fitting 22 is positioned in member 11 at the outer side thereof in communication with the outer end of a duct 23 opening into the bearing to provide grease to the ball bearings and races.

The plate 15 of the bearing assembly at each end of the housing 3 is formed with a radially outwardly projecting arm 24 (FIG. 2) that projects a relatively short distance forwardly of the rear axle, and integrally connected with the forward end of each arm 24 is a substantially horizontally disposed plate 25.

Each plate 25 terminates at its forward end below each side frame 26 (FIG. 2) of the chassis of the vehicle. Usually each side frame member extends upwardly at about the point where each plate 25 terminates, as seen in FIG. 2, and each frame member adjacent thereto may have a generally horizontally disposed plate 27 rigid therewith and extending rearwardly to a position below the plate 25, whereby said plates 25, 27 will be in lapping relation.

For the purpose of distinguishing, the plate 25 may be called the torque transmitting member or arm, since it will function to transmit the braking torque from the wheel to the chassis or body of the vehicle upon application of the brakes.

Disposed between the torque transmitting member 25 and plate 27 is a relatively large washer 30 of relatively soft rubber or rubber-like material, such as neoprene which is substantially impervious to deterioration from sun, oil, acids, grease, etc., and yet elastic and resilient.

Below the plate 27 is another relatively large and relatively thick washer 31 similar to washer 30, and above the torque transmitting member 25 is a washer 32 while another washer 33 is below washer 31.

These washers 30—33 are formed with registering openings through which a bolt 35 passes, and the member 25 and plate 27 are respectively formed with relatively large openings 36, 37 through which said bolt also passes.

Opening 36 in the member 25 (FIG. 3) is preferably rectangular and approximately square.

The opening 37 in plate 27 through which bolt 35 passes is preferably oblong, with its length extending longitudinally of the longitudinal axis of the automobile, or arm 24 and its width may be the same as that of the rectangular or square opening 36. The dimensions of the square opening are substantially greater than the diameter of the bolt 35. The diameter of washer 32, which is a washer of rigid material, is preferably greater than the dimension of opening 36 that is adjacent thereto.

When the automobile is normally loaded, and stationary, the bolts 35 of the bearing assembly at each end of the housing 3 may be approximately centrally within the openings 36, 37. The bolt 35 is not tightened to the point of holding the member 25 and plate 27, and the washers together. There is sufficient looseness in the assembly to enable the torque from the rear wheels (when the brakes are applied), to be transmitted to the plate 27 of each assembly, and to the body or chassis of the automobile, without binding of the assembly at the lapped portions of members 25 and plates 27. The springs 9 that support the chassis will yieldably resist downward movement of the chassis, but nevertheless there will be a compression of the springs and a noticeable downward movement of the chassis when the brakes are applied, which downward movement will be directly proportional to the inertia of the rear wheels and the amount of braking force that is applied. If the brakes are suddenly applied with substantial force when the vehicle is traveling at high speed, the compression of the springs and the downward movement of the members 25 will be greatest, and the "play" between the members 25 and plates 27 and bolts 35 must be sufficient to permit the maximum relative movement between the chassis and the rear axle housing without placing any undue strain on the torque transmitting member (arm 24 and plate 25) and the member 27 that is rigid with the chassis.

In normal travel, the right and left rear wheels will also move up and down independently of each other as the wheels move over bumps and irregularities in the surface of the highway, and the torque transmitting assembly is so flexibly connected that no twisting strains will be placed on the connections between members 25 and 27.

The bolts 35 may be said to substantially define the points of connection between the backing plates and the chassis. These points are normally the same for both rear wheels, but they may be varied according to the diameters of the wheels and the characteristicse of the rear springs. Usually these points will be on an axis that is parallel with the rear axle housing and which axis will usually be approximately within the confines of the laterally projected confines of the rear tires, so as to insure a relatively "soft" depression of the rear end of the body when the brakes are applied, rather than resulting in a harsh shock.

When the automobile is moving rearwardly and the brakes are applied, the arms 24 will tend to be urged upwardly, but rigid with the flange 12 at the rear side of each bearing assembly (FIG. 2) is a rearward projection 34 and rigid with the axle housing 3 and below it is a rearward extending projection 38. These have vertically opposed surfaces between which is a resilient bumper member 39.

Upon said rearward movement of the automobile, the bumper will be engaged under compression between the projections 34, 38 to prevent upward movement of the torque transmitting arm 24 to the point where it would tend to elevate the rear end of the body, and instead, the rear axle housing actually will be urged downwardly.

Merely as a safety measure, should there be a breakage of the bolt 35 or any breakage in the torque transmitting assembly that otherwise would permit free rotation of the backing plate upon application of the brakes, a second projection 40 may be rigid with the flange 12 spaced from the projection 38 a sufficient distance to preclude engagement between the projections 38, 40 or between a resilient bumper 41 carried by projection 40 and projection 38 unless there should be a breakage of bolt 35. The engagement between these projections would enable application of the brakes in the conventional manner in the event of such breakage.

The use of the word "body" herein and in the claims is intended to cover the portion of a vehicle that is sprung on the axle, since there are instances where the body itself may form what formerly was called the "chassis."

One main feature of the invention may be said to reside in a vehicle that includes a horizontally elongated axle housing having a horizontally elongated shaft therein projecting from its opposite ends with a wheel having brake engageable means rigid on each projecting end of said shaft and means carried by the opposite end portions of said housing rotatably supporting said shaft, with springs spaced from the terminating ends of said housing rigidly connected with the latter yieldably supporting a body on said housing. Brake means is carried by said end portions of the axle housing movable into and out of engagement with the brake engageable means that is connected with the wheels, and said end portions of the axle housing are rotatable on said bearings with said wheel independently of the portion of the housing to which said springs are secured for rotation with said wheel and brake engageable means when the brakes are moved into engagement with said brake engageable means, and torque transmitting means connects said end portions with the body that is sprung on said housing for transmitting the braking torque from said brakes to said body in a downward direction upon said brakes engaging said brake engaging means when said vehicle is moving on the ground.

The term "axle" is intended to be inclusive of the conventional arrangement in automobiles in which the rear axle includes differential gears, or may be a single shaft inasmuch as the present invention would function in the same manner in either instance.

The fact that the bearings that support the shaft for rotation within the axle housing also support the end portions of the axle housing for rotation relative to the part of the housing on which the body is sprung so that no braking torque is transmitted to the springs through said part is important. By this arrangement there can be no unbalanced strains placed on the backing plates when the arms 24 or the torque transmitting members exert a downward pull on the body during a braking operation.

In the braking operation, however, it shoud be noted that the ultimate result, by whatever arrangement that is employed, must be one in which there is no modification of the backing plate or spring mountings, although this would not preclude the use of the conventional backing plate or spring mountings for elements, to perform functions such as those performed by members 37—41. Also, the relationship between any of the different elements may obviously be modified to meet different designs.

It is not intended that the precise details of the structure as described, should necessarily be limitations on the invention, and it will be understood that said details may be varied by those skilled in the art without departing from the spirit of my invention.

I claim:

1. In a vehicle that includes a horizontally elongated axle housing having opposite end portions and a part intermediate said end portions with a horizontal axle rotatably supported therein projecting from said opposite end portions and with ground wheels rigid on the projecting ends of said axle supporting said vehicle for forward movement on the ground, and a body sprung on said housing at points adjacent to its said end portions, and which wheel includes brake engageable means rigid therewith:

(a) brake means carried by said end portions of said housing rotatable therewith and movable into and out of engagement with said brake engageable means;

(b) bearings between said end portions of said axle housing and said axle supporting said axle for rotation, (c) means supporting said end portions for rotation on said bearings together with said brake means and relative to the part of said axle housing on which said body is sprung upon movement of said brake means into engagement with said brake engageable means, (d) a flexible connection between said end portions and said brake means connecting them at a point eccentric to the axis of said housing connecting them for transmitting the braking torque of said brake means to said body in a downward direction upon moving said brake means into engagement with said brake engageable means when said vehicle is moving in a forward direction whereby said body will be drawn downwardly.

2. In the structure as defined in claim 1, (e) springs rigidly connected with said part of said housing for springing said body on said part, (f) said means supporting said end portions for rotation being between said bearings and said springs and holding said end portions and said part together and coaxial with said axle.

3. In a construction as defined in claim 1, (e) said flexible connection including pairs of separate means respectively rigid with each of said end portions and with said body at points adjacent to each of said end portions, (f) a connecting member relatively loosely connecting the separate means of each of said pairs thereof for permitting universal movement of one of said sepparate means relative to the other and to said connecting member.

4. In a vehicle that includes a horizontally elongated axle housing having opposite end portions and a part intermediate said end portions with a horizontal axle rotatably supported therein projecting from said opposite end portions and with ground wheels rigid on the projecting ends of said axle supporting said vehicle for forward movement on the ground, and a body sprung on said housing at points adjacent to its said end portions, and which wheel includes brake engageable means rigid therewith:

(a) brake carried by said end portions of said housing rotatable therewith and movable into and out of engagement with said brake engageable means;

(b) bearing between said end portions of said axle housing and said axle supporting said axle for rotation, (c) means supporting said end portions for rotation on said bearings together with said brake means and relative to the part of said axle housing on which said body is sprung upon movement of said brake means into engagement with said brake engageable means, (d) connecting means between said end portions and said brake means for connecting them at points eccentric to the axis of said axle housing for transmitting the braking torque from said brake means to said body upon moving said brake means into engagement with said brake engageable means when said vehicle is moving in said forward direction or in a direction opposite thereto.

5. In combination with a horizontally disposed axle and a ground wheel rigidly secured on one end thereof rotatable therewith upon rotation of said wheel on the ground.

(a) a rear axle housing having an end portion and an intermediate part coaxial therewith, (b) a body, (c) spring means rigidly secured to said intermediate part supporting said body on said part, (d) a bearing within said end portion supporting said axle and end portion coaxial for rotation relative to each other with said axle extending into said portion and said part, (e) a torque transmitting member directly and rigidly connected with said end portion and projecting generally horizontally therefrom;

(f) means flexibly connecting the outer end of said member that is remote from said end portion with said body at a point radially outwardly of said end portion, (g) brake engageable means rigid with said wheel, (h) brake means connected with said end portion movable therewith upon rotatable movement of the latter on said bearing, (i) means supporting said brake means on said end portion for movement into engagement with said brake engageable means, and (j) means connecting said end portion with said part holding said end portion coaxial with said part and supporting said end portion for rotation relative to said part about their common axis.

6. In a vehicle that includes a horizontally elongated axle housing with a horizontally elongated axle rotatably supported therein projecting from opposite end portions of said housing with ground wheels rigid on the projecting ends of said axle, and a body sprung on said housing at points between said end portions and which wheel includes brake engageable means rigid therewith, and brake means carried by said end portions movable into engagement with said brake engageable means, and separate torque transmitting means respectivly connected with each end portion and with said body at a point eccentric to the longitudinal axis of said axle adjacent to each end portion, that comprises:

(a) said end portions being separate from the part of said housing on which said body is sprung for rotation relative to said part together with said brake means upon frictional engagement between said brake means and said brake engageable means when said wheel is rolling on the ground in one direction, (b) a bearing within each end portion supporting each end portion for rotation on said axle, (c) bearing means connecting said end portions with said part for said rotation of said end portions relative to said part, (d) said bearing means comprising a radially outwardly projecting pair of elements respectively rigid with one end portion at each end of said housing and the part of the latter adjacent thereto, and (e) the said torque transmitting means that is connected with each end portion being rigid with and projecting radially from each radially projecting element that is rigid with each end portion.

References Cited in the file of this patent

UNITED STATES PATENTS

| | | |
|---|---|---|
| 2,759,565 | Sauer | Aug. 21, 1956 |
| 2,812,953 | Ronning | Nov. 12, 1957 |

FOREIGN PATENTS

| | | |
|---|---|---|
| 1,056,581 | France | Oct. 21, 1953 |